United States Patent
Matsui

(10) Patent No.: US 7,663,720 B2
(45) Date of Patent: Feb. 16, 2010

(54) LIQUID CRYSTAL DISPLAY DEVICE

(75) Inventor: Chikae Matsui, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 162 days.

(21) Appl. No.: 12/034,739

(22) Filed: Feb. 21, 2008

(65) Prior Publication Data
US 2008/0204647 A1 Aug. 28, 2008

(30) Foreign Application Priority Data
Feb. 23, 2007 (JP) ............................ 2007-043487

(51) Int. Cl.
*G02F 1/1337* (2006.01)
(52) U.S. Cl. ........................ 349/128; 349/99; 349/61; 349/129; 349/123
(58) Field of Classification Search .................. 349/99, 349/61, 56, 128, 129, 123, 191, 143, 144, 349/139
See application file for complete search history.

(56) References Cited

U.S. PATENT DOCUMENTS

| | | | |
|---|---|---|---|
| 6,661,483 B1 * | 12/2003 | Moriwaki et al. | 349/102 |
| 6,680,766 B1 * | 1/2004 | Larson et al. | 349/121 |
| 6,816,217 B2 * | 11/2004 | Sone | 349/114 |
| 6,847,425 B2 * | 1/2005 | Tanada et al. | 349/113 |
| 6,982,774 B1 | 1/2006 | Normura et al. | 349/129 |
| 7,230,663 B1 * | 6/2007 | Wu et al. | 349/114 |
| 2007/0160778 A1 | 7/2007 | Matsumori et al. | 428/1.2 |
| 2007/0263146 A1 * | 11/2007 | Yao et al. | 349/114 |
| 2008/0204647 A1 * | 8/2008 | Matsui | 349/128 |

FOREIGN PATENT DOCUMENTS

| | | | |
|---|---|---|---|
| JP | 11-237635 | 8/1999 | ............ 349/128 X |
| JP | 2001-108995 | 4/2001 | ............ 349/128 X |
| JP | 2007-183474 | 7/2007 | ............ 349/128 X |

* cited by examiner

*Primary Examiner*—Brian M Healy
(74) *Attorney, Agent, or Firm*—Antonelli, Terry, Stout & Kraus, LLP.

(57) ABSTRACT

The present invention provides a liquid crystal display device which can decrease lowering of light utilization efficiency attributed to a light absorption axis of an alignment film. A liquid crystal display device includes a liquid crystal display panel and a backlight arranged on a back surface of the liquid crystal display panel. The liquid crystal display panel includes liquid crystal, and a first substrate and a second substrate arranged to face each other in an opposed manner with the liquid crystal therebetween. The first substrate is arranged between the second substrate and the backlight. The first substrate includes a first polarizer and a first alignment film arranged between the first polarizer and the liquid crystal. The second substrate includes a second polarizer and a second alignment film arranged between the second polarizer and the liquid crystal. The second alignment film has a light absorption axis, and an angle made by the light absorption axis of the second alignment film and a light absorption axis of the second polarizer is set to a value which falls within ±1°. The first alignment film has a light absorption axis, and an angle made by the light absorption axis of the first alignment film and a light absorption axis of the first polarizer is set to a value not less than 89° and not more than 91°. (degree of polarization of the first alignment film)/(degree of polarization of the second alignment film) is set to a value not more than 0.9.

12 Claims, 7 Drawing Sheets

LIQUID CRYSTAL DISPLAY DEVICE

The present application claims priority from Japanese application JP2007-43487 filed on Feb. 23, 2007, the content of which is hereby incorporated by reference into this application.

BACKGROUND OF THE INVENTION

The present invention relates to a liquid crystal display device, and more particularly to a liquid crystal display device including alignment films formed by so-called light alignment.

The liquid crystal display device is configured such that an electric field is applied to liquid crystal interposed between respective substrates arranged to face each other in an opposed manner to drive liquid crystal molecules corresponding to intensity of the electric field. Due to such behavior of the liquid crystal molecules, a quantity of light corresponding to the behavior of the liquid crystal molecules is allowed to pass through the liquid crystal.

Further, for aligning the liquid crystal molecules in the fixed direction (initial alignment direction) when the electric field is not applied to the liquid crystal, an alignment film is formed on surfaces of the respective substrates which are in contact with the liquid crystal.

Further, to visualize the behavior of the initially aligned liquid crystal molecules generated corresponding to a quantity of electric field applied to the liquid crystal molecules as a quantity of light passing through the liquid crystal, a polarizer is formed on surfaces of the respective substrates on sides opposite to the liquid crystal.

In the liquid crystal display device having such a constitution, recently, with respect to the above-mentioned alignment film, there has been known and used an alignment film which is formed by radiating polarized ultraviolet rays or the like to a polymer film thus imparting an alignment function to the polymer film without applying a rubbing treatment to the polymer film. That is, an alignment film formed by so-called light alignment has been used recently.

With respect to the liquid crystal display device, for example, there has been known a liquid crystal display device which forms a pixel electrode using a comb-teeth-shaped electrode having a large number of electrodes arranged in parallel to each other. On the other hand, as the liquid crystal display device, there has been known a liquid crystal display device having the stepped structure on a surface thereof which faces liquid crystal. In applying a rubbing treatment to an alignment film which is formed to cover the stepped structure, there exists a drawback that the uniform alignment treatment cannot be applied to the alignment film.

In this respect, the liquid crystal display device including the alignment film formed by the light alignment can form the alignment film which is not influenced by the stepped structure below the alignment film and hence, such a liquid crystal display device can impart a reliable alignment function to the alignment film.

As described above, the liquid crystal display device which includes an alignment film formed by the light alignment is disclosed in patent document 1 (JP-A-2001-108995) and patent document 2 (JP-A-11-237635), for example.

SUMMARY OF THE INVENTION

However, inventors of the present invention have found that the liquid crystal display device having such a constitution decreases optical transmissivity thereof when light radiated from a backlight, for example, passes through a liquid crystal display panel thus lowering light utilization efficiency.

The inventors of the present invention have sought for a cause of such a drawback, have confirmed that an alignment film formed by light alignment generates a light absorption axis in the alignment direction of the alignment film, and have found out that such a drawback gives rise to lowering of light utilization efficiency since the light absorption axis of the alignment film and a light absorption axis of a polarizer formed on the same substrate as the alignment film have the orthogonal relationship therebetween. Further, the inventors of the present invention also have found a phenomenon that the light absorption axis is generated in the alignment film is not generated with rubbing treatment.

Accordingly, it is an object of the present invention to provide a liquid crystal display device which can decrease lowering of the light utilization efficiency attributed to a light absorption axis of an alignment film.

Here, neither the above-mentioned patent document 1 nor patent document 2 refers to the light-absorption anisotropy which takes the light absorption axis of the alignment film into consideration. Further, with respect to the constitution described in patent document 1 similar to the present invention, there is the description in patent document 1 that one alignment film out of respective alignment films arranged with liquid crystal therebetween exhibits a large radiation quantity of polarized light and another alignment film exhibits a small radiation quantity of polarized light. However, the alignment film which exhibits the large radiation quantity of polarized light is used on a substrate side on which electrodes are formed and hence, it is evident that the constitution described in patent document 1 is opposite to the constitution of the present invention. Further, patent document 2 describes the constitution similar to constitution of the present invention. That is, patent document 2 describes that light alignment is applied to one out of respective alignment films with liquid crystal therebetween and rubbing treatment is applied to another alignment film. However, the alignment film to which the rubbing treatment is applied is not applied with the light alignment and hence, as a matter of course, absorption anisotropy is not generated whereby the present invention clearly differs from the constitution described in patent document 2.

To briefly explain the summary of typical inventions among the inventions described in this application, they are as follows.

(1) According to a first aspect of the present invention, for example, there is provided a liquid crystal display device which includes: a liquid crystal display panel; and a backlight arranged on a back surface of the liquid crystal display panel, wherein the liquid crystal display panel includes liquid crystal, and a first substrate and a second substrate arranged to face each other in an opposed manner with the liquid crystal therebetween; the first substrate is arranged between the second substrate and the backlight; the first substrate includes a first polarizer and a first alignment film arranged between the first polarizer and the liquid crystal; the second substrate includes a second polarizer and a second alignment film arranged between the second polarizer and the liquid crystal; the second alignment film has a light absorption axis, and an angle made by the light absorption axis of the second alignment film and a light absorption axis of the second polarizer is set to a value which falls within ±1°; the first alignment film has a light absorption axis, and an angle made by the light absorption axis of the first alignment film and a light absorption axis of the first polarizer is set to a value not less than 89° and not more than 91°; and (degree of polarization of the first alignment film)/(degree of polarization of the second alignment film) is set to a value not more than 0.9.

(2) On the premise of the constitution of the liquid crystal display device of the present invention in (1), for example, light alignment treatment is applied to the first alignment film and the second alignment film.

(3) On the premise of the constitution of the liquid crystal display device of the present invention in (2), for example, a radiation quantity of light at the time of applying light alignment to the first alignment film is smaller than a radiation quantity of light at the time of applying light alignment to the second alignment film.

(4) On the premise of the constitution of the liquid crystal display device of the present invention in (2), for example, a film thickness of the first alignment film is smaller than a film thickness of the second alignment film.

(5) On the premise of the constitution of the liquid crystal display device of the present invention in any one of (1) to (4), for example, (degree of polarization of the first alignment film)/(degree of polarization of the second alignment film) is set to a value not more than 0.7.

(6) On the premise of the constitution of the liquid crystal display device of the present invention in any one of (1) to (5), for example, (degree of polarization of the first alignment film)/(degree of polarization of the second alignment film) is set to a value not more than 0.5.

(7) On the premise of the constitution of the liquid crystal display device of the present invention in any one of (1) to (6), for example, (degree of polarization of the first alignment film)/(degree of polarization of the second alignment film) is set to a value not less than 0.3.

(8) On the premise of the constitution of the liquid crystal display device of the present invention in any one of (1) to (7), for example, the first substrate includes a pixel electrode and a counter electrode within a pixel region thereof, and the liquid crystal is driven by an electric field generated between the pixel electrode and the counter electrode.

(9) According to a second aspect of the present invention, for example, there is provided a liquid crystal display device which includes: a liquid crystal display panel; and a backlight arranged on a back surface of the liquid crystal display panel, wherein the liquid crystal display panel includes liquid crystal, and a first substrate and a second substrate arranged to face each other in an opposed manner with the liquid crystal therebetween, the first substrate is arranged between the second substrate and the backlight, the first substrate includes a first polarizer and a first alignment film arranged between the first polarizer and the liquid crystal, the second substrate includes a second polarizer and a second alignment film arranged between the second polarizer and the liquid crystal, the second alignment film has a light absorption axis, and an angle made by the light absorption axis of the second alignment film and a light absorption axis of the second polarizer is set to a value which falls within ±1°, the first alignment film has a light absorption axis, and an angle made by the light absorption axis of the first alignment film and a light absorption axis of the first polarizer is set to a value which falls within ±1°, and the alignment direction of the first alignment film is set to make an angle of not less than 60° and not more than 120° with respect to the direction of the light absorption axis of the first alignment film.

(10) On the premise of the constitution of the liquid crystal display device of the present invention in (9), for example, both light alignment treatment and rubbing treatment are applied to the first alignment film, and light alignment treatment is applied to the second alignment film.

(11) On the premise of the constitution of the liquid crystal display device of the present invention in (10), for example, the rubbing treatment is applied to the first alignment film after applying the light alignment treatment to the first alignment film.

(12) On the premise of the constitution of the liquid crystal display device of the present invention in any one of (9) to (11), for example, the first substrate includes a pixel electrode and a counter electrode within a pixel region thereof, and the liquid crystal is driven by an electric field generated between the pixel electrode and the counter electrode.

The present invention is not limited to the above-mentioned constitutions and various modifications are conceivable without departing from the technical concept of the present invention.

The liquid crystal display device having such constitutions can decrease the lowering of light utilization efficiency attributed to a light absorption axis of an alignment film.

DESCRIPTION OF THE PREFERRED EMBODIMENTS

Hereinafter, embodiments of a liquid crystal display device according to the present invention are explained in conjunction with drawings.

(Overall Constitutional View)

Figure 2:
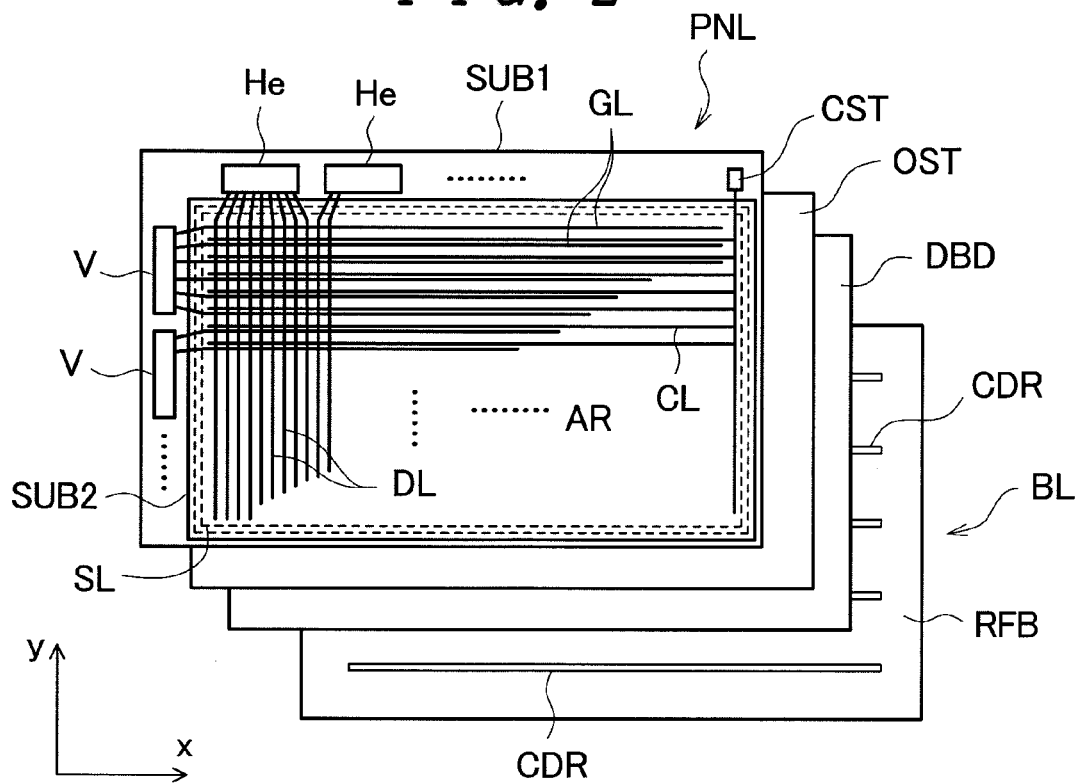
FIG. 2 is a whole schematic view of the liquid crystal display device according to the embodiment of the present invention.

FIG. 2 is an exploded perspective view showing the whole structure of a liquid crystal display device according to the present invention schematically. In FIG. 2, the liquid crystal display device is constituted of a liquid crystal display panel PNL, an optical sheet OST, a diffusion plate DBD, and a backlight BL in order from a viewer's side.

The liquid crystal display panel PNL is formed of an envelope constituted of a pair of transparent substrates SUB1, SUB2 with liquid crystal sandwiched therebetween. The transparent substrate SUB2 has an area slightly smaller than an area of the transparent substrate SUB1, and is arranged to face the transparent substrate SUB1 in an opposed manner in a state that a left side portion and an upper side portion of the transparent substrate SUB1 are exposed, for example. A plurality of scanning signal drive circuits V each formed of a face-down semiconductor chip is arranged in parallel to each other on the left side portion of the transparent substrate SUB1, and a plurality of video signal driver circuits He each formed of a face-down semiconductor chip is arranged in parallel on the upper side portion of the transparent substrate SUB1.

The transparent substrate SUB2 is fixed to the transparent substrate SUB1 using a sealing material SL formed on a periphery of the transparent substrate SUB2. The sealing material SL has a function of sealing the liquid crystal sandwiched between the transparent substrate SUB1 and the transparent substrate SUB2. A region where the liquid crystal is sealed, that is, a region surrounded by the sealing material SL forms a liquid crystal display part AR.

On a liquid-crystal-side surface of the transparent substrate SUB1 in the liquid crystal display part AR, gate signal lines GL and common signal lines CL which extend in the x direction in the drawing and are arranged in parallel to each other in the y direction are formed. These gate signal lines GL and the common signal lines CL are arranged, in FIG. 2, for example, in order of the gate signal line GL, the common signal line CL arranged with a relatively large distance from the gate signal line GL, the gate signal line GL with a small distance from the common signal line CL, the common signal line CL arranged with a relatively large distance from the gate signal line GL, . . . from above.

Further, on a liquid-crystal-side surface of the liquid crystal display part AR, the drain signal lines DL which are electrically insulated from the gate signal lines GL and the common signal lines CL extend in the y direction in the drawing and are extended in parallel to each other in the x direction in the drawing.

Regions each surrounded by a pair of neighboring gate signal lines GL and a pair of neighboring drain signal lines DL constitute the respective pixels, and the liquid crystal display part AR is constituted of the respective pixels arranged in a matrix array. The constitution of each pixel is described in detail later.

The respective gate signal lines GL are, as shown on a left side of the drawing, for example, connected to corresponding electrodes (not shown in the drawing) of the scanning signal drive circuit V after getting over the sealing material SL. The scanning signal drive circuit V is configured to sequentially supply the gate signals formed of a square pulse, for example, to the respective gate signal lines GL from an upper side to a lower side in the drawing thus selecting a pixel row consisting of the respective pixels formed along the gate signal line GL to which a gate signal is supplied.

The respective drain signal lines DL are, as shown on an upper side of FIG. 2, for example, connected to corresponding electrodes (not shown in the drawing) of the video signal drive circuit He after getting over the sealing material SL. The video signal drive circuit He is configured to supply the video signals to the respective drain signal lines DL at timing of outputting of the respective gate signals from the scanning signal drive circuit V thus applying the video signals to the respective pixels of the selected pixel row.

Further, the respective common signal lines CL, in a right-side end portion of FIG. 2, extend while getting over the sealing material SL after being connected to each other in common, and are connected to a common signal supply terminal CST. A common signal having a potential which becomes the reference with respect to a potential of the video signals is supplied to the common signal supply terminal CST, and the common signal is supplied to the respective pixels via the common signal lines CL.

In this manner, to the liquid crystal of the respective pixels to which the common signal and the video signal are supplied, an electric field corresponding to the potential difference of the video signal with respect to the common signal is applied, and liquid crystal molecules are driven in response to the intensity of the electric field thus changing optical transmissivity.

On a back surface (a surface opposite to a viewer) of the liquid crystal display panel PNL, a backlight BL is arranged by way of an optical sheet OST and a diffusion plate DBD. Light from the backlight BL reaches an eye of a viewer after passing through the respective pixels of the liquid crystal display panel PNL through the diffusion plate DBD and the optical sheet OST.

Further, the backlight BL is of a so-called direct backlight, for example. A plurality of light sources CDR is arranged to face the liquid crystal display part AR of the liquid crystal display panel PNL. The respective light sources CDR are arranged on an inner surface side including a reflection plate RFB of an outer frame of the backlight BL in a state that the respective light sources CDR have the longitudinal direction thereof aligned with the x direction in the drawing and are arranged parallel to each other in the y direction.

The direct backlight BL is preferably used in a large-sized liquid crystal display panel PNL. However, the backlight BL is not limited to such a direct backlight BL and may be formed of a backlight constituted of a light guide plate having the same size and the same shape as the liquid crystal display panel PNL and a light source arranged on a side surface of the light guide plate.

(Equivalent Circuit of Pixel)

Figure 3:
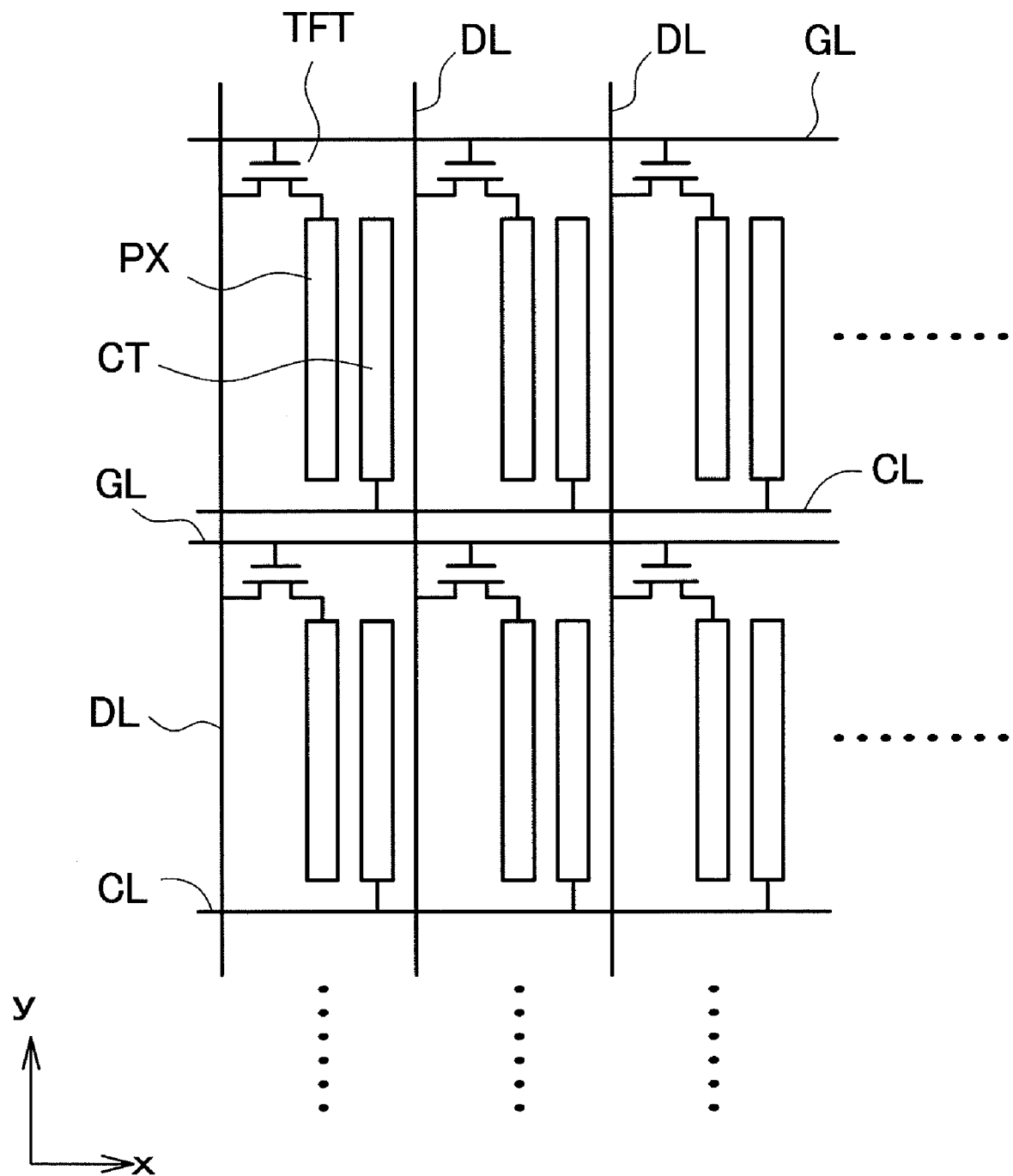
FIG. 3 is an equivalent circuit diagram showing pixels of the liquid crystal display device according to the embodiment of the present invention.

FIG. 3 shows one embodiment of an equivalent circuit of a pixel in the liquid crystal display part AR of the liquid crystal display panel PNL. That is, FIG. 3 shows a circuit formed on a liquid-crystal-side surface of the transparent substrate SUB1. In FIG. 3, out of the respective pixels shown in FIG. 2, the neighboring pixels, for example, six pieces (6=2×3) of pixels are depicted.

As described above, each pixel has a region thereof defined from other neighboring pixels by a pair of neighboring drain signal lines DL and a pair of neighboring gate signal lines GL.

Further, at one corner of the pixel, a thin film transistor TFT having the MIS structure is formed. The thin film transistor TFT has a gate electrode thereof connected to a gate signal line GL arranged close to the gate electrode and a drain electrode thereof connected to a drain signal line DL arranged close to the drain electrode.

Further, in the region of each pixel, a pair of electrodes consisting of a pixel electrode PX and a counter electrode CT is formed. The pixel electrode PX is connected to a source electrode of the thin film transistor TFT, and the counter electrode CT is connected to a common signal line CL.

In such a circuit constitution, a reference potential (a potential which becomes the reference with respect to a video signal) is applied to the counter electrode CT of each pixel via the common signal line CL and a gate signal is sequentially applied to the gate signal lines GL from an upper side of the drawing, for example, so as to select the pixel row. By supplying a video signal to the respective drain signal lines DL at timing of the selection of the pixel row, a potential of the video signal is applied to the pixel electrodes PX of the respective pixels of the pixel row via the thin film transistors TFT which are turned on with the gate signal. Further, a so-called lateral electric field having intensity corresponding to the potential of the video signal is generated between the pixel electrode PX and the counter electrode CT, and liquid crystal is driven in response to the intensity of the lateral electric field.

In such a circuit, the gate signal lines GL, the drain signal lines DL and the thin film transistors TFT exhibit the substantially same geometrical arrangements. However, for example, the counter electrode CT is formed in a planner shape in most of the region (80% or more, for example) of the pixel, and the pixel electrode PX is constituted of one or a plurality of strip-shaped electrodes which overlaps the counter electrode CT by way of an insulation film.

Accordingly, a capacitive element which uses the insulation film as a dielectric film is formed between the pixel electrode PX and the counter electrode CT together with the liquid crystal. When a video signal is applied to the pixel electrode PX, the applied video signal is stored in the capacitive element for a relatively long time.

(Constitution of Pixel)

Figure 4A:
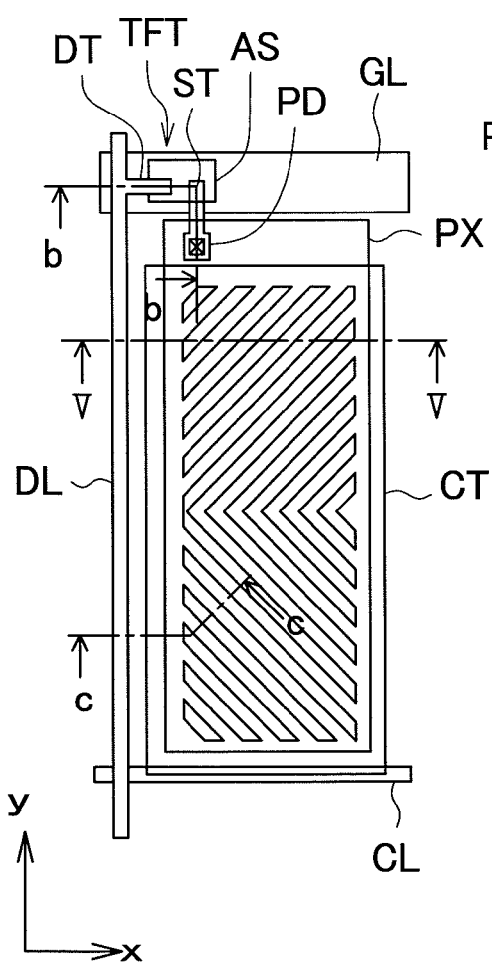
FIG. 4A to FIG. 4C are constitutional views of the pixel of the liquid crystal display device according to the embodiment of the present invention.
Figure 4B:
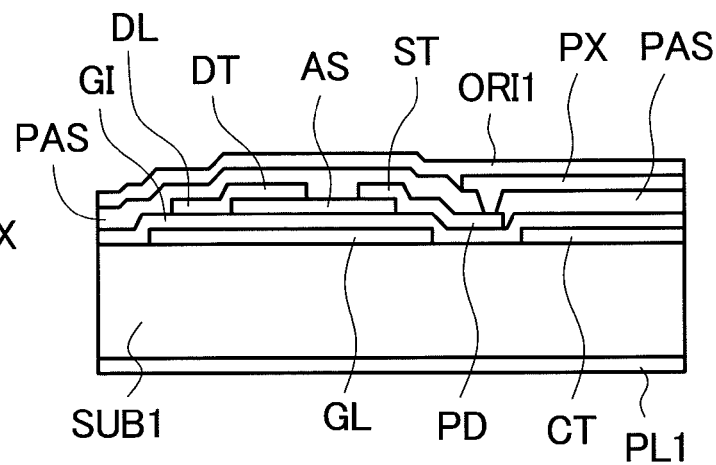
Figure 4C:
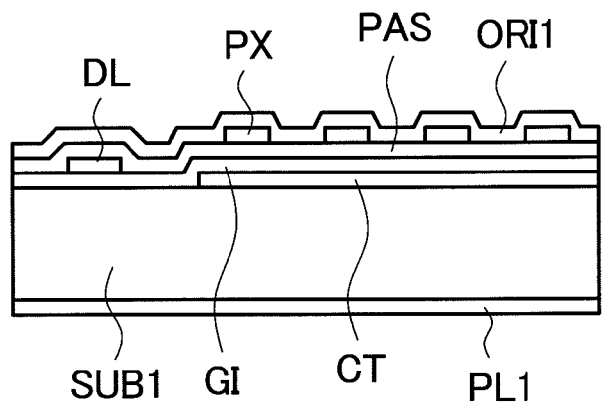

FIG. 4A to FIG. 4C are views showing the constitution of the pixel formed on a liquid-crystal-side surface of the transparent substrate SUB1.

In these drawings, FIG. 4A is a plan view of the pixel, FIG. 4B is a cross-sectional view taken along a line b-b in FIG. 4A, and FIG. 4C is a cross-sectional view taken along a line c-c in FIG. 4A.

First of all, on the liquid-crystal-side surface (front surface) of the transparent substrate SUB1, the gate signal line GL and the common signal line CL are formed in parallel to each other with a relatively large distance therebetween.

In a region defined between the gate signal line GL and the common signal line CL, the counter electrode CT made of a transparent conductive material such as ITO (Indium-Tin-Oxide), for example, is formed. The counter electrode CT is formed to overlap the common signal line CL at a common-signal-line-CL-side peripheral portion thereof so that the counter electrode CT is electrically connected with the common signal line CL.

Further, the insulation film GI is formed on the surface of the transparent substrate SUB1 in a state that the insulation film GI also covers the gate signal line GL, the common signal line CL and the counter electrode CT. The insulation film GI functions as a gate insulation film of the thin film transistor TFT in a region where the thin film transistor TFT described later is formed. A film thickness and the like of the insulation film GI are set in view of such a function.

A semiconductor layer AS made of amorphous silicon, for example, is formed on an upper surface of the insulation film GI at a position where the semiconductor layer AS overlaps a portion of the gate signal line GL. This semiconductor layer AS constitutes the semiconductor layer of the above-mentioned thin film transistor TFT.

The drain signal lines DL are formed in an extending manner in the y direction in the drawing. The drain signal line DL forms a portion thereof into an extending portion which overlaps the semiconductor layer AS. The extending portion functions as a drain electrode DT of the thin film transistor TFT.

Further, the source electrode ST which is simultaneously formed with the formation of the drain signal line DL and the drain electrode DT faces the drain electrode DT on the semiconductor layer AS in an opposed manner and, at the same time, the source electrode ST has an extending portion which slightly extends toward the pixel region side from the semiconductor layer AS. This extending portion constitutes a pad portion PD which is connected with a portion of the pixel electrode PX explained later.

In forming the semiconductor layer AS on the insulation film GI, the semiconductor layer AS is formed with a surface thereof doped with impurity of high concentration, for example. After forming the drain electrode DT and the source electrode ST by patterning, an impurity layer of high concentration which is formed in a region other than regions where the drain electrode DT and the source electrode ST are formed is etched using the drain electrode DT and the source electrode ST as masks. Due to such an operation, the impurity layer of high concentration remains between the semiconductor layer AS and the drain electrode DT as well as between the semiconductor layer AS and the source electrode ST, and the impurity layer forms an ohmic contact layer.

Due to such a constitution, the thin film transistor TFT constitutes a transistor having the so-called inverse staggered MIS structure which uses the gate signal lines GL as gate electrodes.

The MIS-structure transistor is driven such that the drain electrode DT and the source electrode ST are changed over in response to applying of a bias. In the explanation of this embodiment, for the sake of convenience, the electrode on a side connected to the drain signal line DL is referred to as the drain electrode DT, and the electrode on a side connected to the pixel electrode PX is referred to as the source electrode ST.

A protective film PAS is formed on a surface of the transparent substrate SUB1 in a state that the protective film PAS also covers the thin film transistors TFT. The protective film PAS is provided for preventing the direct contact of the thin film transistor TFT with liquid crystal. Further, the protective film PAS is interposed between the counter electrode CT and the pixel electrode PX described later and also functions as a dielectric film of the capacitive element formed between the counter electrode CT and the pixel electrode PX along with the above-mentioned insulation film GI.

The pixel electrode PX is formed on an upper surface of the protective film PAS. The pixel electrode PX is made of a transparent conductive material such as ITO (Indium-Tin-Oxide), for example, and is formed on the counter electrode CT in an overlapping manner with a wide overlapping area.

Here, a large number of slits are formed in the pixel electrode PX in parallel in the direction intersecting the y direction of the pixel electrode PX thus being configured to have a group of electrodes consisting of a large number of strip-shaped electrodes which have both ends thereof connected to each other.

Further, on the surface of the transparent substrate SUB1, an alignment film ORI1 is formed in a state that the alignment film ORI1 also covers the pixel electrode PX. This alignment film ORI1 is directly brought into contact with the liquid crystal and is configured to determine the initial alignment direction of liquid crystal molecules. The alignment film ORI1 is formed of a polymer film to which an alignment function is imparted with the radiation of polarized ultraviolet rays or the like by a so-called light alignment treatment. Accordingly, even when the number of step structures is increased due to the formation of the pixel electrodes PX on a surface of the alignment film ORI1 which faces the liquid crystal, it is possible to acquire the alignment film ORI1 to which the uniform alignment treatment is applied. The alignment film ORI1 is described in detail later.

With respect to the respective electrodes of the pixel electrode PX, as shown in FIG. 4A, the region of the pixel is divided in two vertically in the drawing, for example, wherein the respective electrodes in one region are formed to extend in the direction of +45° with respect to the running direction of the gate signal line GL, and the respective electrodes in another region are formed to extend in the direction of −45° with respect to the running direction of the gate signal line GL, for example. That is, the pixel electrode PX adopts a so-called multi-domain method. This method can eliminate a drawback that coloring occurs depending on the viewing direction when the direction of the slits formed in the pixel electrode PX (the direction of the group of electrodes forming the pixel electrode PX) in one pixel is the single direction. Accordingly, it is not always necessary for the pixel electrode PX to adopt such a constitution. Further, also with respect to angles of +45° and −45°, they are not limited to such values.

Further, on a surface of the transparent substrate SUB1 opposite to the liquid crystal, for example, an iodine-drawing-type polarizer PL1 is arranged. The polarizer PL1 is configured to visualize the behavior of liquid crystal molecules attributed to the application of an electric field to the liquid crystal molecules as a quality of light which passes through the liquid crystal. Accordingly, the polarizer PL1 is formed to cover at least the liquid crystal display part AR of the liquid crystal display panel PNL. The polarizer PL1 is explained in detail later.

In the constitution of the pixel shown in FIG. 4A to FIG. 4C, the semiconductor layer of the thin film transistor TFT is made of amorphous silicon. However, the semiconductor layer of the thin film transistor TFT is not limited to amorphous silicon, and may be made of poly-silicon. In this case, the semiconductor layer of the thin film transistor TFT is desirably constituted of a top-gate-type thin film transistor TFT.

(Constitution of Transparent Substrate SUB2)

Figure 5:
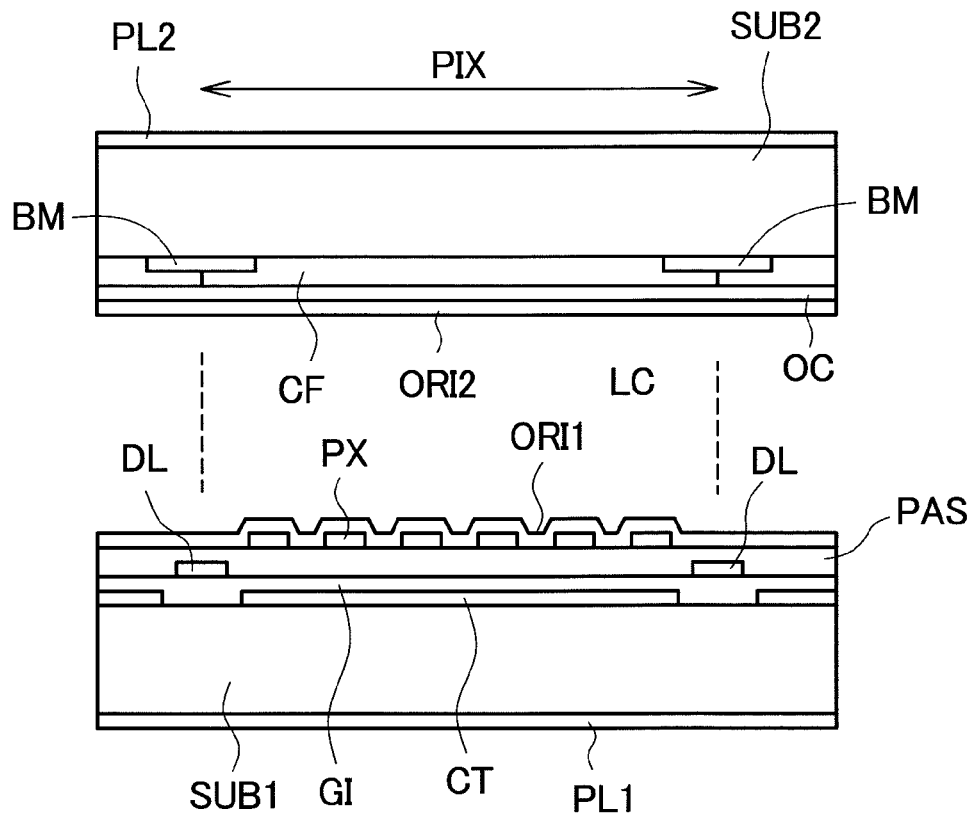
FIG. 5 is a cross-sectional view taken along a line V-V in FIG. 4A.

FIG. 5 is a cross-sectional view taken along a line V-V in FIG. 4A and also shows the transparent substrate SUB2 which is arranged to face the above-mentioned transparent substrate SUB1 with the liquid crystal LC sandwiched therebetween.

On a liquid-crystal-side surface of the transparent substrate SUB2, a light blocking film BM is formed. The light blocking film BM is provided for defining each pixel PIX from other neighboring pixels PIX. For example, the light blocking film BM is formed to overlap the gate signal lines GL, the common signal lines CL and the drain signal lines DL on the transparent substrate SUB1 side. Due to such a constitution, the light blocking film BM is, for example, formed in a pattern where an opening is formed in a center portion of each pixel PIX except for a periphery of each pixel PIX. Further, although not shown in the drawing, the light blocking film BM is formed to cover also thin film transistors TFT thus preventing the change of properties of the semiconductor layers AS due to the radiation of light. Here, the formation of the light blocking film BM may not be limited to a grid pattern and may be formed in a pattern constituted of stripes extending in the longitudinal direction or in the lateral direction.

Further, color filters CF are formed in portions of the light blocking film BM where the openings are formed, and peripheries of the color filters CF overlap the light blocking film BM. The color filters CF are, in three pixels arranged close to each other, formed of the color filters CF of red (R), the color filters CF of green (G) and the color filters CF of blue (B) respectively. These three pixels constitute one pixel for color display. Here, a leveling film OC made of a resin, for example, is formed to cover these color filters CF.

Further, on an upper surface of the leveling film OC, an alignment film ORI2 is formed. This alignment film ORI2 is brought into direct contact with the liquid crystal and is configured to determine the initial alignment direction of liquid crystal molecules. The alignment film ORI2 is, in the same manner as the alignment film ORI1, formed of a polymer film to which an alignment function is imparted with the radiation of polarized ultraviolet rays or the like by so-called light alignment treatment. The alignment film ORI2 is described in detail later.

Further, on a surface of the transparent substrate SUB2 opposite to the liquid crystal, for example, an iodine-drawing-type polarizer PL2 is arranged. The polarizer PL2 is configured to visualize the behavior of liquid crystal molecules attributed to the application of an electric field to the liquid crystal molecules as a quality of light which passes through the liquid crystal. Accordingly, the polarizer PL2 is formed to cover at least the liquid crystal display part AR of the liquid crystal display panel PNL. The polarizer PL2 is explained in detail later.

The respective pixels PIX formed in this manner are, for example, constituted in a so-called normally black mode where a black display is performed in a state that no electric field is generated between the pixel electrodes PX and the counter electrodes CT.

(One Mode of Relationship Between Respective Alignment Films ORI1, ORI2 and Respective Polarizers PL1, PL2)

Figure 1:
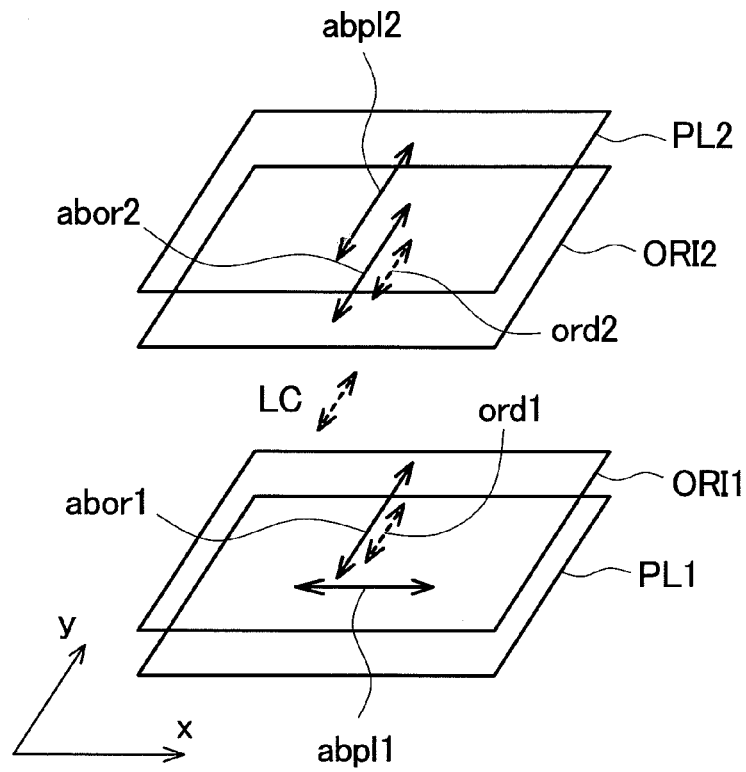
FIG. 1 is an explanatory view of a liquid crystal display device according to one embodiment of the present invention, and also is a view showing the relationship between a polarizer and an alignment film.

FIG. 1 only depicts the polarizer PL1, the alignment film ORI1, the polarizer PL2 and the alignment film ORI2 out of the above-mentioned respective parts which constitute the liquid crystal display device without changing the arrangement relationship of these parts. Accordingly, the x direction and the y direction shown in FIG. 1 agree with the x direction and the y direction shown in FIG. 2, FIG. 3 and FIG. 4A.

In FIG. 1, first of all, the directions of optical absorption axes in the polarizers PL1, PL2 and the respective directions of the alignment direction and the light absorption axes in the alignment films ORI1, ORI2 are shown.

Here, the alignment films ORI1, ORI2 are, as described above, formed of a polymer film to which an alignment function is imparted with the radiation of polarized ultraviolet rays or the like by so-called light alignment treatment. Accordingly, the light absorption axes parallel to the alignment directions are generated.

In FIG. 1, the polarizer PL1 and the polarizer PL2 are arranged such that a light absorption axis abpl1 of the polarizer PL1 and a light absorption axis abpl2 of the polarizer PL2 are arranged substantially orthogonal to each other (within 90°±1°) However, the light absorption axis abpl1 of the polarizer PL1 and the light absorption axis abpl2 of the polarizer PL2 may intersect each other with an angle other than the above-mentioned angle provided that the cross-nicol arrangement is substantially adopted as viewed optically.

In FIG. 1, as an example, the light absorption axis abpl1 of the polarizer PL1 may be arranged in the x direction, and the light absorption axis abpl2 of the polarizer PL2 may be arranged in the y direction.

In a lateral-electric-field-type liquid crystal display device, the initial alignment direction of the liquid crystal LC desirably makes a predetermined angle with respect to the extending direction (the direction of +45°, −45° with respect to the x direction in case shown in FIG. 4A) of the linear portions of the pixel electrode PX and hence, in FIG. 1, as an example, the initial alignment direction of the liquid crystal LC is set to the y direction and a twist angle is set to 0°. Accordingly, both of the alignment direction ord1 of the alignment film ORI1 and the alignment direction ord2 of the alignment film ORI2 are arranged in the direction parallel to the y direction. However, the alignment direction ord1 of the alignment film ORI1 and the alignment direction ord2 of the alignment film ORI2 shown in FIG. 1 merely indicate one example, and these directions are suitably changed corresponding to the structure of the pixel and a twisting angle of the liquid crystal LC. Further, although the initial alignment direction of the liquid crystal LC desirably makes a predetermined angle other than 0° and 90° with respect to the extending direction of the linear portion of the pixel electrode PX, the initial alignment direction of the liquid crystal LC may be arranged parallel to or orthogonal to the extending direction of the linear portion of the pixel electrode PX.

The alignment film ORI2 is arranged such that the alignment direction ord2 of the alignment film ORI2 becomes substantially parallel to (within ±1°) the light absorption axis abp12 of the polarizer PL2. In this case, although the light absorption axis abor2 of the alignment film ORI2 is generated parallel to the alignment direction ord2, the light absorption axis abor2 of the alignment film ORI2 becomes substantially parallel to (within ±1°) the light absorption axis abp12 of the polarizer PL2 and hence, this does not cause lowering of contrast of the alignment film ORI2 with respect to the relationship with the polarizer PL2 during a white display. To the contrary, during a black display, the degree of polarization is increased compared to the single polarizer PL2 and hence, the brightness during the black display is decreased thus enhancing contrast.

On the other hand, the alignment film ORI1 is arranged such that the alignment direction ord1 of the alignment film ORI1 becomes substantially orthogonal (within 90°±1°) to the light absorption axis abp11 of the polarizer PL1. In this case, although the light absorption axis abor1 of the alignment film ORI1 is generated parallel to the alignment direction ord1, the light absorption axis abor1 of the alignment film ORI1 becomes substantially orthogonal (within 90°±1°) to the light absorption axis abp11 of the polarizer PL1. Accordingly, light which passes through the polarizer PL1 is partially absorbed by the alignment film ORI1 thus giving rise to the reduction of contrast of the alignment film ORI1 due to the relationship between the alignment film ORI1 and the polarizer PL1.

From the above, although not described explicitly in FIG. 1, the degree of polarization of the alignment film ORI1 is set smaller than the degree of polarization of the alignment film ORI2. The degree of polarization of the alignment film ORI1 is set in such a manner to increase a light transmission quantity of the alignment film ORI1 thus decreasing the influence attributed to the light absorption axis abor1.

Here, the degree of polarization of a film having a light absorption axis (polarizer or an alignment film to which light alignment is applied) is generally expressed by a following formula (1).

$$\text{degree of polarization} = (T0 - T90)/(T0 + T90) \quad (1)$$

Here, T0 is transmissivity when two same films overlap each other with light absorption axes thereof arranged parallel to each other, and non-polarized light is incident on these films.

T90 is transmissivity when two same films overlap each other with light absorption axes thereof arranged orthogonal to each other, and non-polarized light is incident on these films.

The alignment film ORI1 with the decreased degree of polarization can be realized by, to be more specific, for example, decreasing a radiation quantity of polarized light in the light alignment of the alignment film ORI1. This is because the degree of polarization is proportional to the radiation quantity of polarized light. Accordingly, by setting the radiation quantity of polarized light in the light alignment of the alignment film ORI1 smaller than the radiation quantity of polarized light in the light alignment of the alignment film ORI2, it is possible to acquire the above-mentioned advantageous effects.

Further, as another realization method, the degree of polarization of the alignment film ORI1 can be decreased by setting a film thickness of the alignment film ORI1 smaller than a film thickness of the alignment film ORI2. By decreasing the degree of polarization of the alignment film ORI1 in this manner, it is possible to acquire the above-mentioned advantageous effects. It is needless to say that the above-mentioned two realization methods may be combined with each other.

The liquid crystal display device having such a constitution can, when the liquid crystal display device performs display driving in a normally black mode, largely decrease loss of light in so-called while display and, at the same time, decrease brightness in black display.

Figure 6:
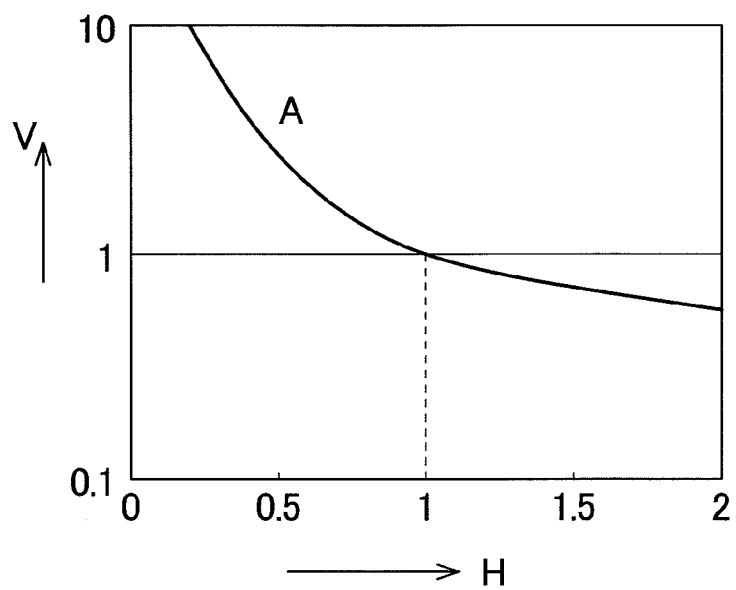
FIG. 6 is a graph showing a contrast relative value with respect to a ratio of degree of polarizations of the respective alignment films.

FIG. 6 is a graph in which a value of (degree of polarization of alignment film ORI1)/(degree of polarization of alignment film ORI2) is taken on an axis of abscissas (H-directional axis in the drawing), a contrast relative value is taken on an axis of ordinates (V-directional axis in the drawing), and the relationship between these values is expressed by a curve A.

Here, the degree of polarization of the alignment film ORI2 is set to 0.005, for example, and the above-mentioned graph is prepared by assuming the contrast relative value acquired when the degree of polarization of the alignment film ORI1 is set equal to the degree of polarization of the alignment film ORI2 as 1.

In the embodiment shown in FIG. 1, the degree of polarization of the alignment film ORI1 is set smaller than the degree of polarization of the alignment film ORI2 and hence, in the above-mentioned graph, the value of (degree of polarization of alignment film ORI1)/(degree of polarization of alignment film ORI2) is set to a value smaller than 1 and larger than 0. In an actual liquid crystal display device, the value of (degree of polarization of alignment film ORI1)/(degree of polarization of alignment film ORI2) is preferably set to a value not more than 0.9 and larger than 0. The value of (degree of polarization of alignment film ORI1)/(degree of polarization of alignment film ORI2) is more preferably set to a value not more than 0.7 or, still more preferably set to a value not more than 0.5. Accordingly, contrast relative value can be set larger than 1 thus realizing the enhancement of contrast.

Figure 7A:
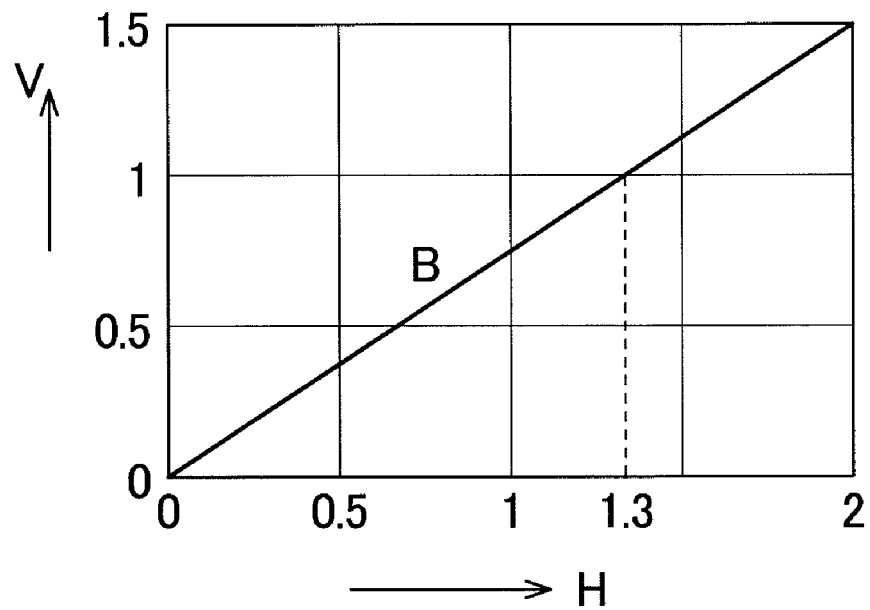
FIG. 7A and FIG. 7B are graphs respectively showing degree-of-polarization relative values of the alignment films and anchoring-strength relative values with respect to radiation quantities of polarized light.

FIG. 7A is a graph in which a radiation quantity of polarized light (J/cm$^2$) at the time of performing light alignment treatment is taken on an axis of abscissas (H-directional axis in the drawing), an alignment-film degree-of-polarization relative value is taken on an axis of ordinates (V-directional axis in the drawing), and the relationship between these values is expressed. The relationship between the radiation quantity of polarized light and the alignment-film degree-of-polarization relative value is, since the degree of polarization of the alignment film is proportional to the radiation quantity of polarized light, expressed by a straight line B shown in the drawing.

Here, the graph shows the degree-of-polarization relative value when the radiation quantity of polarized light is changed (0 to 2 $J/cm^2$) by setting the degree-of-polarization relative value when the radiation quantity of polarized light to the alignment film ORI2 or the alignment film ORI1 is set to 1.3 $J/cm^2$ to 1.

As can be clearly understood from the graph, when the radiation quantity of polarized light to the alignment film ORI2 is set to 1.3 $J/cm^2$ and the radiation quantity of polarized light to the alignment film ORI1 is set to a value smaller than 1.3 $J/cm^2$ and larger than 0, the degree-of-polarization relative value of the alignment film can be set to a value smaller than 1 and larger than 0. The degree-of-polarization relative value of the alignment film having the value which falls within such a range can, as shown in the above-mentioned graph in FIG. 6, set the contrast relative value to a value larger than 1 whereby the contrast can be enhanced.

Figure 7B:
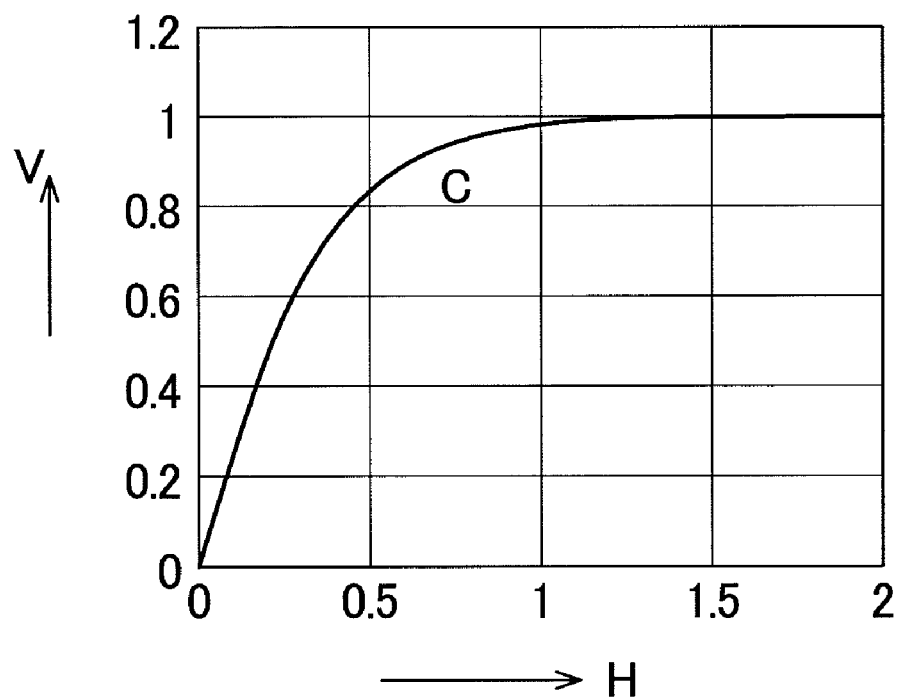

Further, FIG. 7B is a graph in which the radiation quantity ($J/cm^2$) when polarized light is radiated to the alignment film is taken on an axis of abscissas (H-directional axis in the drawing), an anchoring-strength relative value is taken on an axis of ordinates (V-directional axis in the drawing), and the relationship between these values is expressed by a curve C. Here, the graph shows an anchoring-strength relative value when the radiation quantity of polarized light is changed (0 to 2 $J/cm^2$) on a condition that the anchoring-strength relative value when the radiation quantity of polarized light to the alignment film ORI2 or the alignment film ORI1 is set to 1.3 $J/cm^2$ is set to 1. Here, the anchoring strength implies an alignment restricting force, and the larger the anchoring strength, it is possible to obtain the alignment film with smaller image retention.

As can be clearly understood from FIG. 7B, when the degree-of-polarization relative value of the alignment film is set to a value smaller than 1 and larger than 0.3, for example, the anchoring-strength relative value is not decreased exceeding 0.8 and hence, the decrease of the anchoring-strength relative value becomes trivial. Accordingly, it is preferable to set the value of (degree of polarization of alignment film ORI1)/(degree of polarization of alignment film ORI2) to a value not less than 0.3.

Figure 8:
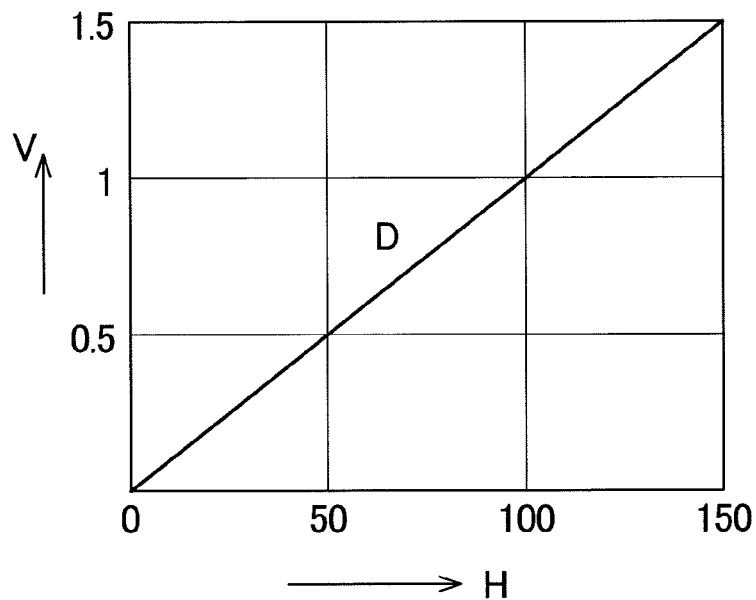
FIG. 8 is a graph showing a relative value of a degree of polarization with respect to an alignment film thickness.

FIG. 8 is a graph in which a thickness (nm) of the alignment film is taken on an axis of abscissas (H-directional axis in the drawing), an alignment-film degree-of-polarization relative value is taken on an axis of ordinates (V-directional axis in the drawing), and the relationship between these values is expressed. The relationship between the thickness of the alignment film and the alignment-film degree-of-polarization relative value is, since the degree of polarization of the alignment film is proportional to the thickness of the alignment film, expressed by a straight line D shown in the drawing.

Here, the graph shows the degree-of-polarization relative value when the film thickness is changed (0 to 150 nm) by setting the degree-of-polarization relative value when the film thickness of the alignment film ORI1 or the alignment film ORI2 is set to 100 nm to 1.

As can be clearly understood from the graph, when the film thickness of the alignment film ORI2 is set to 100 nm and the film thickness of the alignment film ORI1 is set to a value smaller than 100 nm and larger than 0, the degree-of-polarization relative value of the alignment film can be set to a value smaller than 1 and larger than 0. The degree-of-polarization relative value of the alignment film having the value which falls within such a range can, as shown in the above-mentioned graph in FIG. 6, set the contrast relative value to a value larger than 1 whereby the contrast can be enhanced.

Here, in setting the degree-of-polarization relative values of the alignment films to desired values by making thicknesses of the respective alignment films different from each other, it is confirmed that the anchoring strengths are not changed largely. However, when the respective alignment films are too thin, there arises a drawback such as film peeling-off and hence, the thicknesses of the respective alignment films may be set to values within ranges which allow the respective alignment films to acquire desired film strengths and anchoring strengths.

(Another Mode of Relationship Between Respective Alignment Films ORI1, ORI2 and Respective Polarizers PL1, PL2)

Figure 9:
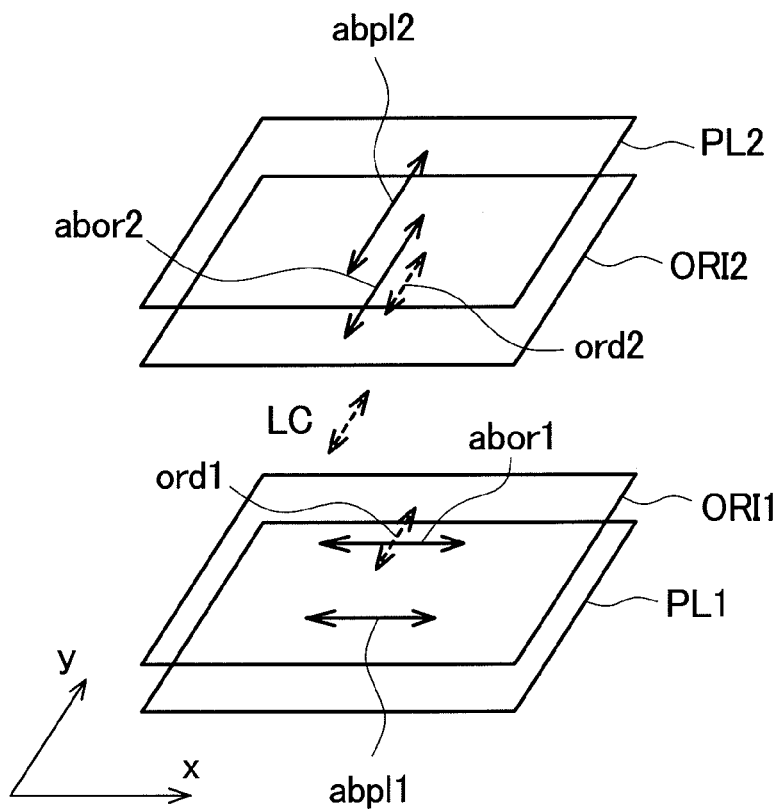
FIG. 9 is an explanatory view of a liquid crystal display device according to another embodiment of the present invention, and also is a view showing the relationship between a polarizer and an alignment film.

FIG. 9 is a view corresponding to FIG. 1 and shows another embodiment of the relationship between the respective alignment films ORI1, ORI2 and the respective polarizers PL1, PL2.

The constitution which makes this mode different from the mode shown in FIG. 1 lies in the constitution of the alignment film ORI1. Firstly, the light absorption axis abor1 of the alignment film ORI1 is arranged substantially parallel to the light absorption axis abpl1 of the polarizer PL1 (within ±1°) Further, the alignment direction ord1 of the alignment film ORI1 is arranged in the direction different from the direction of the light absorption axis abor1 of the polarizer PL1.

In this case, it is desirable that the alignment direction ord1 of the alignment film ORI1 is set to make an angle which falls within a range from 60° to 120°, for example, with respect to the direction of the light absorption axis abor1 of the alignment film ORI1. FIG. 9 shows a case in which the alignment direction ord1 of the alignment film ORI1 is set substantially orthogonal (90°±1°) to the light absorption axis abor1 of the alignment film ORI1.

Here, to set the light absorption axis abor1 of the alignment film ORI1 different from the alignment direction ord1 as described in this embodiment, the light alignment treatment and the rubbing treatment may be used in combination. For example, firstly, the light alignment treatment is applied to the alignment film ORI1. Due to such treatment, the alignment direction ord1 and the light absorption axis abor1 are arranged in the same direction. Thereafter, the rubbing treatment is applied to the alignment film ORI1 in the direction different from the direction of the light absorption axis abor1. Due to such treatment, the alignment direction ord1 can be changed to the direction along which the rubbing treatment is applied without changing the direction of the light absorption axis abor1. This is because no light absorption axis is generated by the rubbing treatment and, at the same time, an alignment restricting force imparted by the rubbing treatment is far superior to an alignment restricting force imparted by the light alignment treatment.

Here, even when the rubbing treatment is performed prior to the light alignment treatment, the substantially same advantageous effects can be obtained. However, in such a case, the alignment direction is slightly disturbed and hence, there arises a drawback that the properties of the alignment film is slightly deteriorated. Accordingly, when such a drawback is not permissible, it is desirable to perform the rubbing treatment after the light alignment treatment.

Further, in this embodiment, the direction of the light absorption axis abor1 of the alignment film ORI1 and the direction of the light absorption axis abpl1 of the polarizer PL1 are set substantially parallel to each other (within ±1°). Due to such setting of the light absorption axes, loss of light attributed to the light absorption axis abor1 of the alignment film ORI1 can be minimized and, at the same time, the degree of polarization can be increased compared to a case that the only polarizer PL1 is used and hence, the contrast of the alignment film ORI1 can be enhanced.

Advantageous effects with respect to the alignment film ORI2 are substantially equal to the corresponding advantageous effects explained in conjunction with FIG. 1 and hence, the explanation of the advantageous effects is omitted.

Accordingly, the liquid crystal display device having the above-mentioned constitution acquires an advantageous effect that loss of light in so-called white display can be largely decreased when display driving is performed in a normally black mode and, at the same time, brightness can be decreased in black display.

Figure 10:
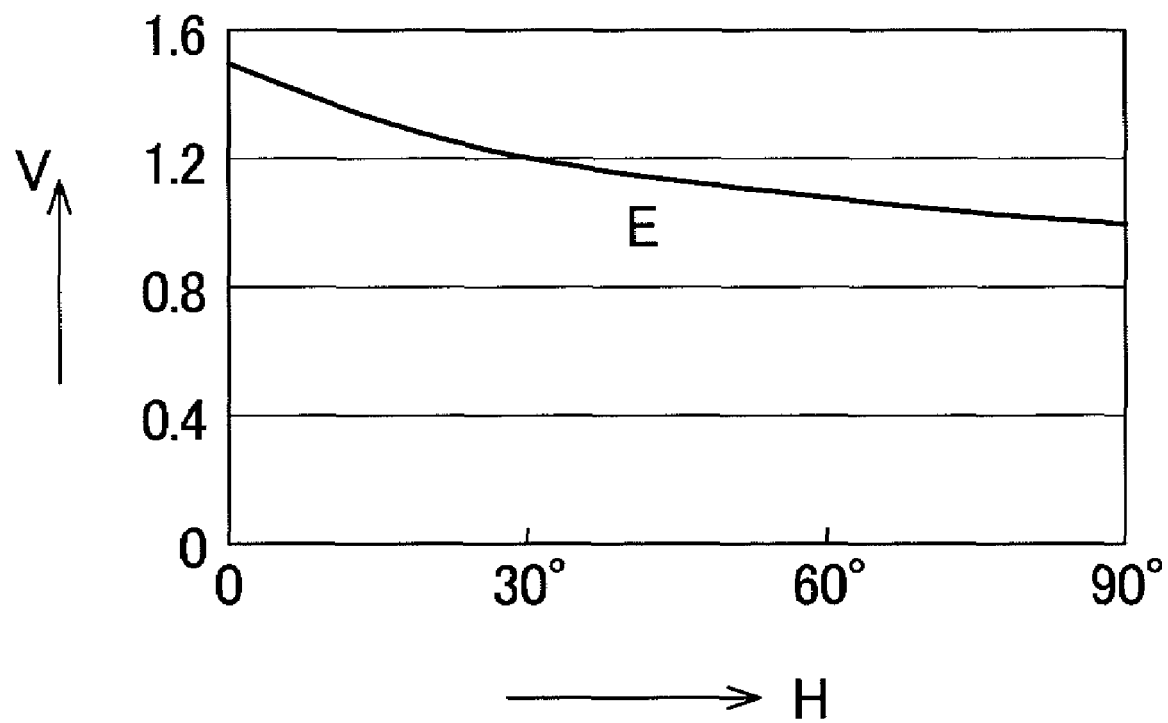
FIG. 10 is a graph showing a contrast relative value with respect to an angle made by a light absorption axis abpl1 of a polarizer PL1 and a light absorption axis abor1 of an alignment film ORI1.

FIG. 10 is a graph in which an intersecting angle of the light absorption axis abor1 of the alignment film ORI1 with respect to the light absorption axis abpl1 of the polarizer PL1 is taken on an axis of abscissas (H-directional axis in the drawing), a contrast relative value is taken on an axis of ordinates (V-directional axis in the drawing), and the relationship between these values is expressed as a curve E.

Here, the graph shows the contrast relative value when the intersecting angle is changed from 0 to 90° in a state that the contrast value when the intersecting angle of the light absorption axis abor1 of the alignment film ORI1 is orthogonal (90°) to the light absorption axis abpl1 of the polarizer PL1 is set to 1.

As can be clearly understood from the graph, as intersecting angle of the light absorption axis abor1 of the alignment film ORI1 with respect to the light absorption axis abpl1 of the polarizer PL1 approaches 0°, that is, as the light absorption axis abor1 of the alignment film ORI1 approaches the light absorption axis abpl1 of the polarizer PL1 in the direction that the light absorption axis abor1 becomes parallel to the light absorption axis abpl1, it is possible to make the contrast relative value approximate a maximum value.

Here, provided that lowering of contrast is permissible, the intersecting angle may be set to a value which falls within a range from 0° to 30°.

The above-mentioned respective embodiments may be used in a single form or in combination unless these embodiments contradict each other. This is because advantageous effects of the respective embodiments can be acquired individually or synergistically.

What is claimed is:

1. A liquid crystal display device comprising:
a liquid crystal display panel; and
a backlight arranged on a back surface of the liquid crystal display panel, wherein
the liquid crystal display panel includes liquid crystal, and a first substrate and a second substrate arranged to face each other in an opposed manner with the liquid crystal therebetween,
the first substrate is arranged between the second substrate and the backlight,
the first substrate includes a first polarizer and a first alignment film arranged between the first polarizer and the liquid crystal,
the second substrate includes a second polarizer and a second alignment film arranged between the second polarizer and the liquid crystal,
the second alignment film has a light absorption axis, and an angle made by the light absorption axis of the second alignment film and a light absorption axis of the second polarizer is set to a value which falls within ±1°,
the first alignment film has a light absorption axis, and an angle made by the light absorption axis of the first alignment film and a light absorption axis of the first polarizer is set to a value not less than 89° and not more than 91°, and
(degree of polarization of the first alignment film)/(degree of polarization of the second alignment film) is set to a value not more than 0.9.

2. A liquid crystal display device according to claim 1, wherein light alignment treatment is applied to the first alignment film and the second alignment film.

3. A liquid crystal display device according to claim 2, wherein a radiation quantity of light at the time of applying light alignment to the first alignment film is smaller than a radiation quantity of light at the time of applying light alignment to the second alignment film.

4. A liquid crystal display device according to claim 2, wherein a film thickness of the first alignment film is set smaller than a film thickness of the second alignment film.

5. A liquid crystal display device according to claim 1, wherein (degree of polarization of the first alignment film)/(degree of polarization of the second alignment film) is set to a value not more than 0.7.

6. A liquid crystal display device according to claim 1, wherein (degree of polarization of the first alignment film)/(degree of polarization of the second alignment film) is set to a value not more than 0.5.

7. A liquid crystal display device according to claim 1, wherein (degree of polarization of the first alignment film)/degree of polarization of the second alignment film) is set to a value not less than 0.3.

8. A liquid crystal display device according to claim 1, wherein the first substrate includes a pixel electrode and a counter electrode within a pixel region thereof, and the liquid crystal is driven by an electric field generated between the pixel electrode and the counter electrode.

9. A liquid crystal display device comprising:
a liquid crystal display panel; and
a backlight arranged on a back surface of the liquid crystal display panel, wherein
the liquid crystal display panel includes liquid crystal, and a first substrate and a second substrate arranged to face each other in an opposed manner with the liquid crystal therebetween,
the first substrate is arranged between the second substrate and the backlight,
the first substrate includes a first polarizer and a first alignment film arranged between the first polarizer and the liquid crystal,
the second substrate includes a second polarizer and a second alignment film arranged between the second polarizer and the liquid crystal,
the second alignment film has a light absorption axis, and an angle made by the light absorption axis of the second alignment film and a light absorption axis of the second polarizer is set to a value which falls within ±1°,
the first alignment film has a light absorption axis, and an angle made by the light absorption axis of the first alignment film and a light absorption axis of the first polarizer is set to a value which falls within ±1°, and
the alignment direction of the first alignment film is set to make an angle of not less than 60° and not more than 120° with respect to the direction of the light absorption axis of the first alignment film.

10. A liquid crystal display device according to claim 9, wherein both light alignment treatment and rubbing treatment are applied to the first alignment film, and light alignment treatment is applied to the second alignment film.

11. A liquid crystal display device according to claim 10, wherein the rubbing treatment is applied to the first alignment film after applying the light alignment treatment to the first alignment film.

12. A liquid crystal display device according to claim 9, wherein the first substrate includes a pixel electrode and a counter electrode within a pixel region thereof, and the liquid crystal is driven by an electric field generated between the pixel electrode and the counter electrode.

* * * * *